US012038354B2

(12) United States Patent
Zhang et al.

(10) Patent No.: US 12,038,354 B2
(45) Date of Patent: Jul. 16, 2024

(54) SYSTEMS AND METHODS FOR OPERATING A POWER GENERATING ASSET

(71) Applicant: General Electric Company, Schenectady, NY (US)

(72) Inventors: Zhanpan Zhang, Niskayuna, NY (US); Guangliang Zhao, Latham, NY (US); Jin Xia, Niskayuna, NY (US); John Joseph Mihok, Schenectady, NY (US); Frank William Ripple, Jr., Broadalbin, NY (US); Kyle Raymond Barden, Troy, NY (US); Alvaro Enrique Gil, Niskayuna, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 335 days.

(21) Appl. No.: 17/032,218

(22) Filed: Sep. 25, 2020

(65) Prior Publication Data

US 2022/0099532 A1   Mar. 31, 2022

(51) Int. Cl.
*G01M 99/00*  (2011.01)
*G05B 19/042*  (2006.01)
*G06N 20/00*  (2019.01)

(52) U.S. Cl.
CPC ......... *G01M 99/005* (2013.01); *G05B 19/042* (2013.01); *G06N 20/00* (2019.01); *G05B 2219/2619* (2013.01)

(58) Field of Classification Search
CPC ... G01M 99/005; G06N 20/00; G05B 19/042; G05B 2219/2619
See application file for complete search history.

(56) References Cited

U.S. PATENT DOCUMENTS 8,219,356 B2   7/2012  Mihok et al.
10,397,810 B2   8/2019  Yang et al.
(Continued)

FOREIGN PATENT DOCUMENTS

CN   106168539 A   11/2016
CN   107153929 A   9/2017
(Continued)

OTHER PUBLICATIONS

European Search Report for EP Application No. 21198336.6, mail date Feb. 22, 2022.

*Primary Examiner* — Brent A. Fairbanks
(74) *Attorney, Agent, or Firm* — Dority & Manning, P.A.

(57) ABSTRACT

A system and method are provided for operating a power generating asset. Accordingly, a plurality of operational data sets are received by a controller. The operational data sets include at least one indication of a performance anomaly. A plurality of predictive models are implemented by the controller to determine a plurality of potential root causes of the performance anomaly and a plurality of corresponding probabilities for each of the potential root causes. A consolidation model is generated for classifying the plurality of potential root causes and corresponding probabilities. The consolidation model is trained via a training data set to correlate the plurality of potential root causes to an actual root cause for the performance anomaly. The consolidation model is implemented by the controller to determine the actual root cause of the performance anomaly based on the plurality of potential root causes and corresponding probabilities.

19 Claims, 6 Drawing Sheets

(56) References Cited

U.S. PATENT DOCUMENTS

| | | | | |
|---|---|---|---|---|
| 10,454,753 | B2* | 10/2019 | Sasturkar | H04L 41/22 |
| 10,956,632 | B2* | 3/2021 | Wang | H02J 3/38 |
| 11,049,004 | B1* | 6/2021 | Segev | G06N 3/084 |
| 2010/0023307 | A1* | 1/2010 | Lee | G05B 23/0254 |
| | | | | 703/7 |
| 2012/0253996 | A1* | 10/2012 | Bernardy | G05B 23/0267 |
| | | | | 705/28 |
| 2014/0058615 | A1 | 2/2014 | Hatch et al. | |
| 2014/0163926 | A1 | 6/2014 | Pedersen | |
| 2017/0024649 | A1 | 1/2017 | Yan et al. | |
| 2017/0206468 | A1* | 7/2017 | Ghosh | G05B 23/0275 |
| 2017/0352245 | A1 | 12/2017 | Maher et al. | |
| 2018/0293723 | A1* | 10/2018 | Bae | G06F 18/2115 |
| 2018/0365089 | A1 | 12/2018 | Okanohara et al. | |
| 2019/0362070 | A1* | 11/2019 | Abbaszadeh | G06F 21/55 |
| 2020/0049129 | A1* | 2/2020 | Girardot | F03D 7/0224 |
| 2020/0084087 | A1 | 3/2020 | Sharma et al. | |
| 2020/0210538 | A1* | 7/2020 | Wang | G06F 30/20 |
| 2020/0219014 | A1* | 7/2020 | Verma | G06N 20/20 |
| 2021/0385135 | A1* | 12/2021 | Côté | G06F 17/18 |
| 2022/0082090 | A1* | 3/2022 | Kumar | F03D 17/00 |
| 2022/0200279 | A1* | 6/2022 | Kawakami | G06N 3/0454 |

FOREIGN PATENT DOCUMENTS

| | | |
|---|---|---|
| EP | 2068220 A1 | 6/2009 |
| EP | 2555142 A1 | 2/2013 |
| WO | WO2017094267 A1 | 6/2017 |

* cited by examiner

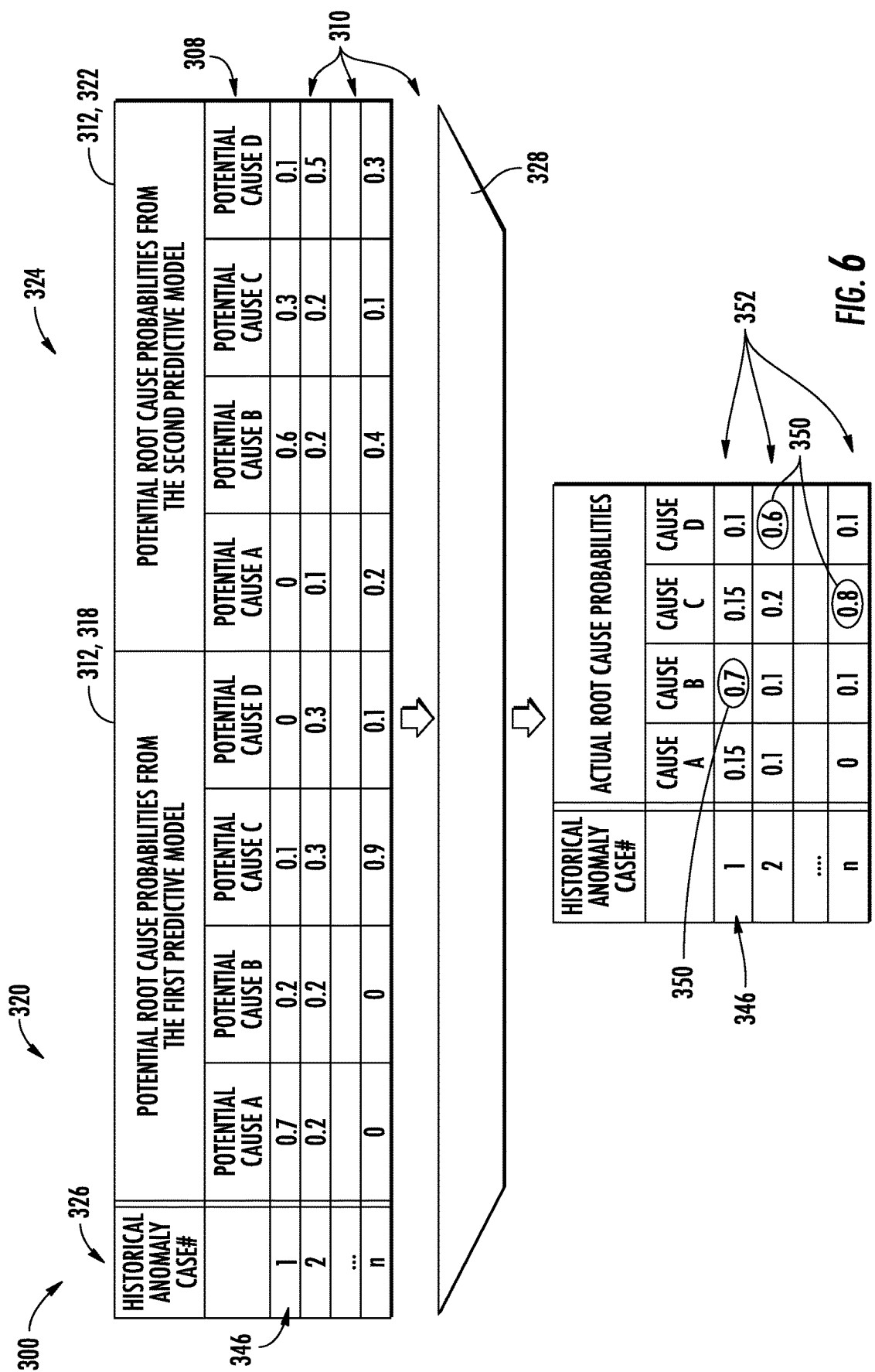

SYSTEMS AND METHODS FOR OPERATING A POWER GENERATING ASSET

FIELD

The present disclosure relates in general to power generating assets, and more particularly to systems and methods for operating power generating assets by determining an actual root cause of a performance anomaly.

BACKGROUND

As disclosed herein, power generating assets may take a variety of forms and may include power generating assets which rely on renewable and/or nonrenewable sources of energy. Those power generating assets which rely on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

During the lifecycle of a power generating asset, the asset may develop at least one performance anomaly. Typically, manual engineering diagnostic processes may be required to identify the root cause of the performance anomaly. In general, each type of performance anomaly may require a specific engineering troubleshooting guide, which may include multiple diagnostic patterns. Such a manual process may be time-consuming and may be incapable of addressing complex or inadequately studied performance issues.

In view of the aforementioned, the art is continuously seeking new and improved systems and methods for operating a power generating asset which facilitates the efficient identification of the root cause of a performance anomaly.

BRIEF DESCRIPTION

Aspects and advantages of the invention will be set forth in part in the following description, or may be obvious from the description, or may be learned through practice of the invention.

In one aspect, the present disclosure is directed to a method for operating a power generating asset. The method may include receiving, with the controller, a plurality of operational data sets including data indicative of a performance anomaly for the power generating asset. The method may also include determining, via a plurality of predictive models implemented by the controller, a plurality of potential root causes of the performance anomaly and a plurality of corresponding probabilities for each of the plurality potential root causes based on the plurality of operational data sets. The method may include generating, via the controller, a consolidation model classifying the plurality of potential root causes of the performance anomaly and the plurality of corresponding probabilities for each of the plurality of potential root causes. Additionally, the method may include training, via the controller, the consolidation model via a training data set to correlate the plurality of potential root causes and the plurality of corresponding probabilities to an actual root cause for the performance anomaly. The method may also include determining, via the consolidation model implemented by the controller, the actual root cause of the performance anomaly based on the plurality of potential root causes of the performance anomaly and the plurality of corresponding probabilities. Further, the method may include implementing a control action based on the determined actual root cause.

In an embodiment, generating the consolidation model may include generating a statistical algorithm or machine learning algorithm configured to determine an optimal transfer function between the plurality of probabilities for each of the plurality of potential root causes and an actual probability for each of the plurality of potential root causes.

In an additional embodiment, the training data set may include a plurality of indications of historical performance anomalies, a plurality of corresponding root causes, and a plurality of historical operational parameters.

In a further embodiment, training the consolidation model may include developing a plurality of correlations between the plurality root causes and a plurality of operational parameters reflected by the plurality of operational data sets.

In yet a further embodiment, the plurality of operational data sets may include an environmental data set. The environmental data set may include a plurality of parameters indicative of at least one environmental condition affecting the power generating asset.

In an embodiment, the training data set may also include an engineering data set. The engineering data set may correlate the performance anomalies to the actual root cause.

In an additional embodiment, the method may include incorporating the plurality of operational data sets, the plurality of potential root causes and corresponding probabilities, and the actual root cause determined by the consolidation model into the training data set so as to establish a training feedback loop.

In a further embodiment, the plurality of operational data sets may include at least a first operational data set and a second operational data set. The plurality of potential root causes of the performance anomaly and the plurality of corresponding probabilities for each of the plurality of potential root causes may include at least a first plurality of potential root causes and corresponding probabilities, booted and a second plurality of potential root causes and corresponding probabilities. The first plurality of potential root causes may correlate to the first operational data set and the second plurality of potential root causes may correlate to the second operational data set. At least a portion of the second operational data set may be different than the first operational data set.

In yet a further embodiment, determining the plurality of potential root causes of the performance anomaly and the plurality of corresponding probabilities for each of the plurality of potential root causes may include determining a performance anomaly signature for the performance anomaly as reflected by at least one of the plurality of operational data sets. The performance anomaly signature may include a plurality of data points indicative of an occurrence of the performance anomaly. The determination of the performance anomaly signature may facilitate identification of the performance anomaly instances within at least one additional data set of the plurality of operational data sets.

In an embodiment, the method may include defining an anomaly range for each instance of the performance anomaly within at least one of the operational data sets. The corresponding plurality of potential root causes and corresponding probabilities may be determined by the corresponding predictive model based on data points of the plurality of data points that fall within the anomaly range.

In an additional embodiment, the method may include applying, via the controller, the anomaly range to each of the remaining operational data sets. The corresponding plurality of potential root causes and corresponding probabilities for each of the remaining operational data sets may be determined by the corresponding predictive model based on the data points of the plurality of data points that fall within the anomaly range for each of the operational data sets.

In a further embodiment, the method may include validating the actual root cause of the performance anomaly determined by the consolidation model via an engineering data set. The engineering data set may include a nominal plurality of root cause-to-anomaly correlations.

In a further embodiment, at least one predictive model of the plurality of predictive models may be configured to classify the plurality of potential root causes and corresponding probabilities thereof of the performance anomaly based on one of the plurality of operational data sets. Additionally, the method may include training, via the controller, the at least one predictive model via the training data set.

In yet a further embodiment, the power generating asset may include a wind turbine, a solar power generating asset, a hydroelectric plant, and/or a hybrid power generating facility.

In another aspect, the present disclosure is directed to a system for operating a power generating asset. The system includes at least one sensor operably coupled to the power generating asset. Additionally, the system includes a controller community coupled to the sensor(s). The controller includes at least one processor configured to perform a plurality of operations. The plurality of operations may include, but are not limited to, receiving a plurality of operational data sets including data indicative of a performance anomaly for the power generating asset, determining, via a plurality of predictive models, a plurality of potential root causes of the performance anomaly and a plurality of corresponding probabilities for each of the plurality of potential root causes based on the plurality of operational data sets, classifying the plurality of potential root causes of the performance anomaly and the plurality of corresponding probabilities for each of the plurality of potential root causes by executing a consolidation model, and determining, via the consolidation model, an actual root cause of the performance anomaly based on the plurality of potential root causes of the performance anomaly and the plurality of corresponding probabilities.

In additional embodiments, the plurality of operations may include any of the methods, steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates a tabular representation of potential root causes and corresponding probabilities according to the present disclosure.

Figure 1:
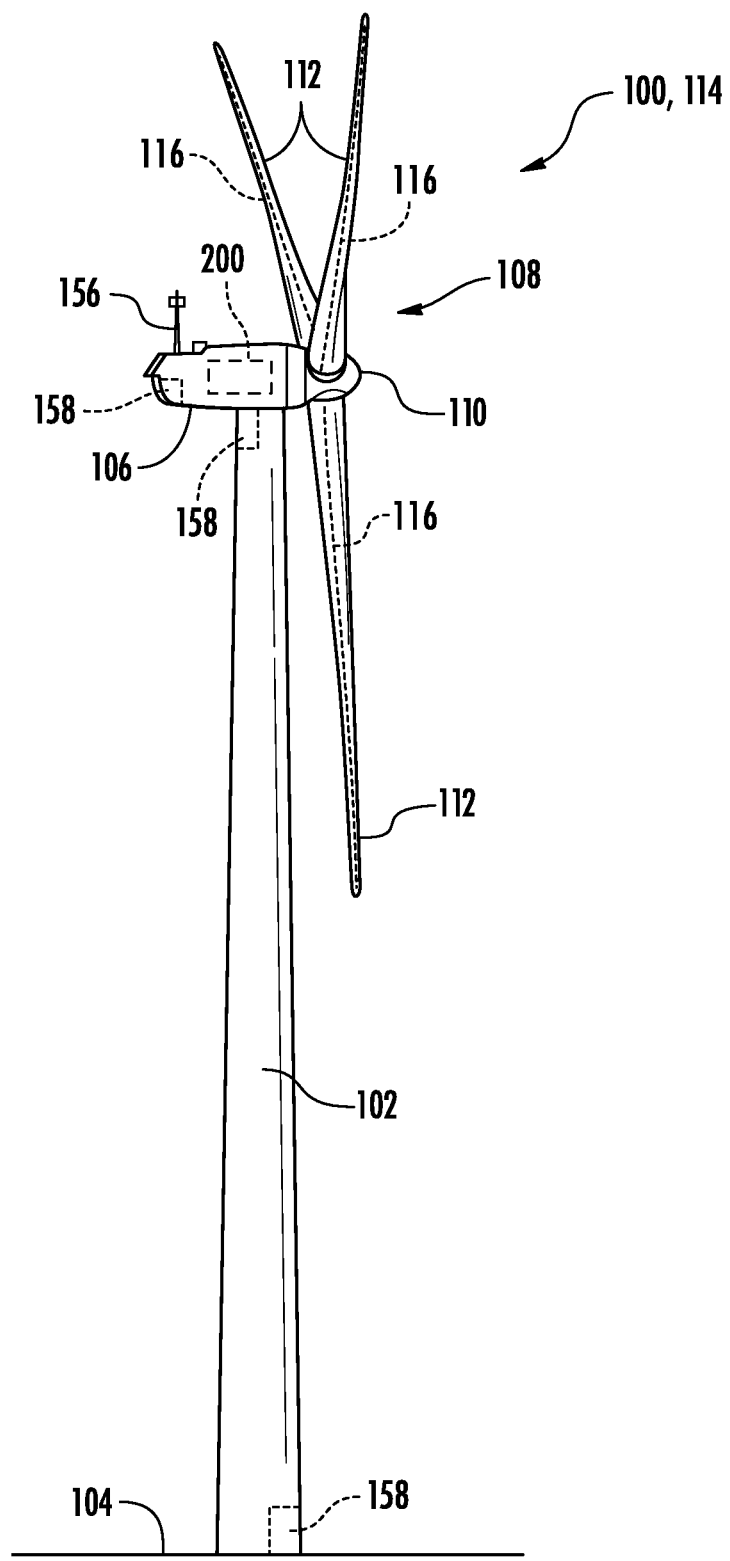
FIG. 1 illustrates a perspective view of one embodiment of a power generating asset configured as a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Generally, the present disclosure is directed to a machine-learning, model-based analytic for operating a power generating asset. In particular, the present disclosure may include systems and methods which facilitate the identification of an actual root cause of a performance anomaly experienced by the power generating asset. More specifically, the power generating asset may receive a number of operational data sets from a sensor system indicating the power generating asset is experiencing, or has experienced, a performance anomaly. To address the performance anomaly, it may be desirable to identify the root cause thereof. Accordingly, a number of predictive models may be employed to generate a number of potential root causes and a corresponding probability that each of the potential root causes is the actual root cause of the performance anomaly.

Each of the predictive models may be configured to analyze/monitor different systems of the power generating asset and may therefore utilize different portions of the operational data sets to accomplish this analysis/monitoring. As each of the predictive models may be analyzing/monitoring different systems and may be considering somewhat different data sets, each of the predictive models may generate a different combination of potential root causes and corresponding probabilities thereof. In other words, different artificial intelligence (AI) techniques may be leveraged to identify multiple diagnostic patterns of the performance anomaly in the operational data.

In order to determine the actual, or most likely, root cause of the anomaly, it may be desirable to determine an optimal transfer function between the plurality of probabilities for each of the plurality of potential root causes and the actual probability for each of the plurality of potential root causes. Accordingly, a consolidation model may be generated, trained, and employed to consolidate the potential root causes from the predictive models and determine the actual root cause of the performance anomaly.

For example, in an embodiment wherein the power generating asset is a wind turbine, one predictive model may be configured to detect a rotor imbalance based on monitored vibrations in the main shaft of the wind turbine. At the same time, a second predictive model may be configured to analyze the health of the pitch control system by monitoring a power draw of the various pitch motors, while a third predictive model may monitor the environmental conditions and the power output of the generator to determine if the power output equals an expected power output for the given wind conditions. In such an embodiment, an unexplained drop in the power production of the wind turbine may be a performance anomaly. Due to monitoring the different systems, as reflected by the corresponding data sets, the three different predictive models may each indicate that a different potential root cause (e.g., pitch system failure, yaw system failure, blade damage, gearbox failure, sensor misalignment, etc.) may be the most likely actual root cause. However, by fusing and consolidating the potentially disparate root cause predictions from the disparate models, the consolidation model may identify the actual root cause of the anomaly.

It should be appreciated employing the consolidation model to classify the potentially disparate root cause predictions from the various predictive models may increase the accuracy of the root cause determination. This may facilitate the implementation of an appropriate control action based on the actual root cause. In contrast, without the employment of the consolidation model, each of the potential root causes predicted by the various predictive models may require investigation or may drive unnecessary and/or unwarranted control actions resulting in increased downtimes and/or maintenance costs.

Referring now to the drawings, FIG. 1 illustrates a perspective view of one embodiment of a power generating asset 100 according to the present disclosure. As shown, the power generating asset 100 may be configured as a wind turbine 114. In an additional embodiment, the power generating asset 100 may, for example, be configured as a solar power generating asset, a hydroelectric plant, a fossil fuel generator, and/or a hybrid power generating asset.

When configured as a wind turbine 114, the power generating asset 100 may generally include a tower 102 extending from a support surface 104, a nacelle 106, mounted on the tower 102, and a rotor 108 coupled to the nacelle 106. The rotor 108 may include a rotatable hub 110 and at least one rotor blade 112 coupled to, and extending outwardly from, the hub 110. For example, in the illustrated embodiment, the rotor 108 includes three rotor blades 112. However, in an additional embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The power generating asset for 100 may also include a controller 200. When configured as a wind turbine 114, the controller 200 may be configured as a turbine controller centralized within the nacelle 106. However, in other embodiments, the controller 200 may be located within any other component of the wind turbine 100 or at a location outside the wind turbine. Further, the controller 200 may be communicatively coupled to any number of the components of the power generating asset 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
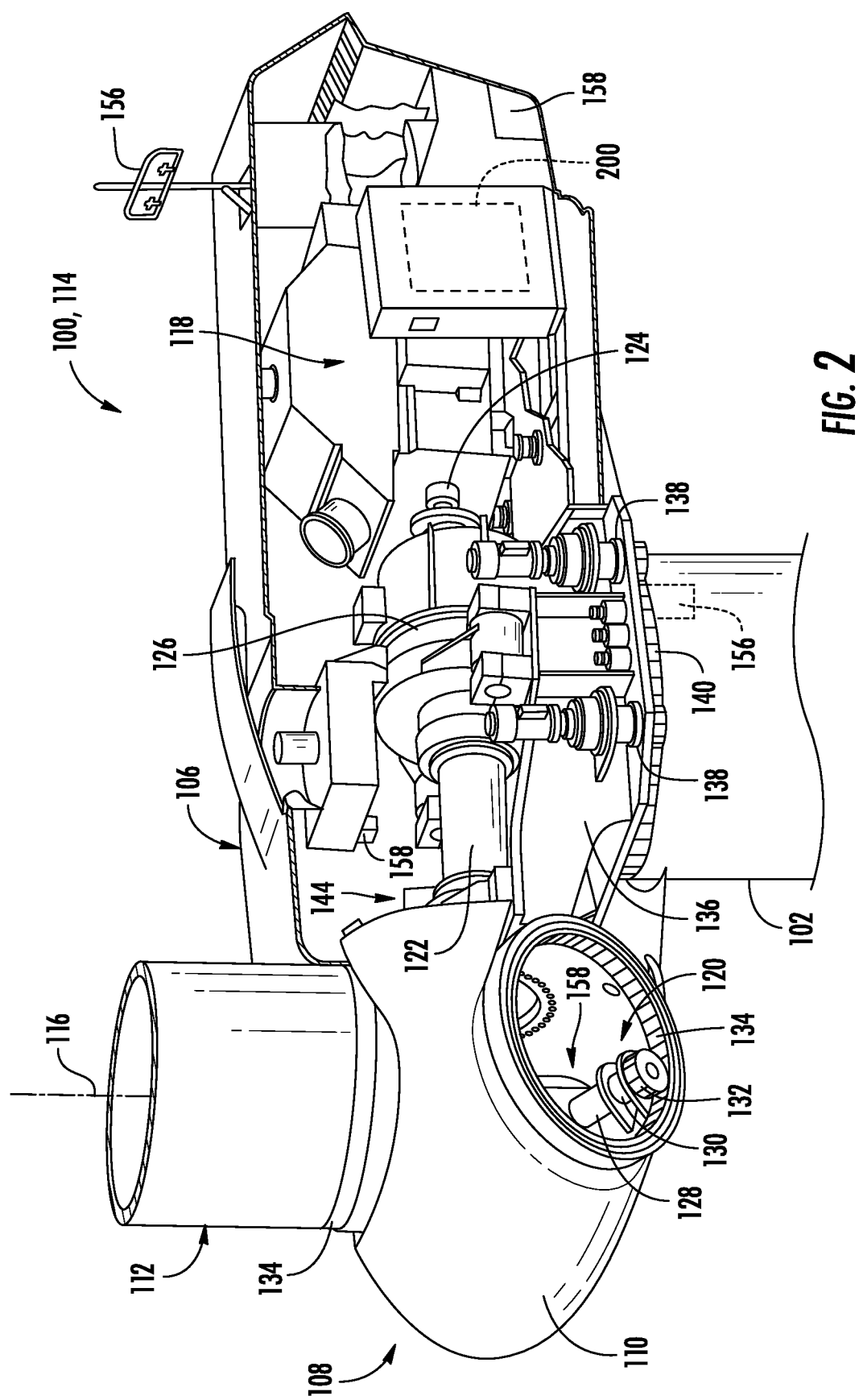
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 114 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Each rotor blade 112 may also include a pitch control mechanism 120 configured to rotate each rotor blade 112 about its pitch axis 116. Each pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

Similarly, the wind turbine 114 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 114). It should be appreciated that the controller 200 may direct the yawing of the nacelle 106 and/or the pitching of the rotor blades 112 so as to aerodynamically orient the wind turbine 114 relative to a wind acting on the wind turbine 114, thereby facilitating power production.

In several embodiments, the power generating asset 100 may include at least one environmental sensor 156 for monitoring at least one environmental condition affecting the power generating asset 100. In an embodiment, the environmental sensor(s) 156 may, for example, be a wind vane, an anemometer, a lidar sensor, thermometer, barometer, or any other suitable sensor. The environmental data set 302 (FIG. 4) gathered by the environmental sensor(s) 156 may include measures of wind direction, wind speed, wind shear, wind gust, wind veer, atmospheric pressure, pressure gradient and/or temperature. Thus, the environmental data set 302 may define the conditions in which the power generating asset 100 is operating and, therefore, may facilitate the determination of an expected performance of the power generating asset 100 based on the prevailing environmental conditions. In at least one embodiment, the environmental sensor(s) 156 may be mounted to the nacelle 106 at a location downwind of the rotor 108. It should be appreciated that the environmental sensor(s) 156 may include a network of sensors and may be positioned away from the power generating asset 100.

In addition, the power generating asset 100 may include one or more operational sensors 158. The operational sensor(s) 158 may be configured to detect a performance of the power generating asset 100 in response to the environmental condition. The operational sensor(s) 158 may be configured to monitor multiple parameters associated with the performance and/or health of a component of the power generating asset 100. For example, the operational sensor(s) 158 may monitor parameters associated with vibrations, audible signals, visual indications, angular positions, rotational velocities, bending moments, power consumption, power generation, temperature and/or other suitable parameters.

In an embodiment, the operational sensor(s) 158 may, for example, be a rotational speed sensor operably coupled to the controller 200. For example, the operational sensor(s) 158 may be directed at the rotor shaft 122 of the power generating asset 100, such as the wind turbine 114. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a direct current (DC) tachometer, an alternating current (AC) tachometer, a digital tachometer, a contact tachometer a non-contact tachometer, or a time and frequency tachometer.

Still referring to FIG. 2, in an embodiment, the operational sensor(s) 158 may be configured to collect data indicative of a response of the component(s) of the power generating asset 100 to the environmental condition(s) or other load. For example, in an embodiment, the operational sensor(s) 158 may be configured as a strain gauge configured to detect a tensile load on the component, such as the rotor 108. In an additional embodiment, the operational sensor(s) 158 may include at least one of an accelerometer, a photo-optic sensor, an acoustic sensor, a transducer, a lidar system, a vibration sensor, a force sensor, a rate sensor, a piezo sensor, a position sensor, an inclinometer, and/or a torque sensor. In an embodiment, the operational sensor(s) 158 may, for example, be configured to collect sensor data indicative of at least one of a nacelle acceleration, a vibration of the tower 102, a bending of the rotor shaft 122, an acoustic signature of the power generating asset 100, an occlusion of an optical sensor due to a passage of the rotor blade 112, a rotor blade 112 discontinuity, a horizontal and vertical deflection of the rotor 108, and/or an acceleration of the rotor 108.

It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the power generating asset 100.

Figure 3:
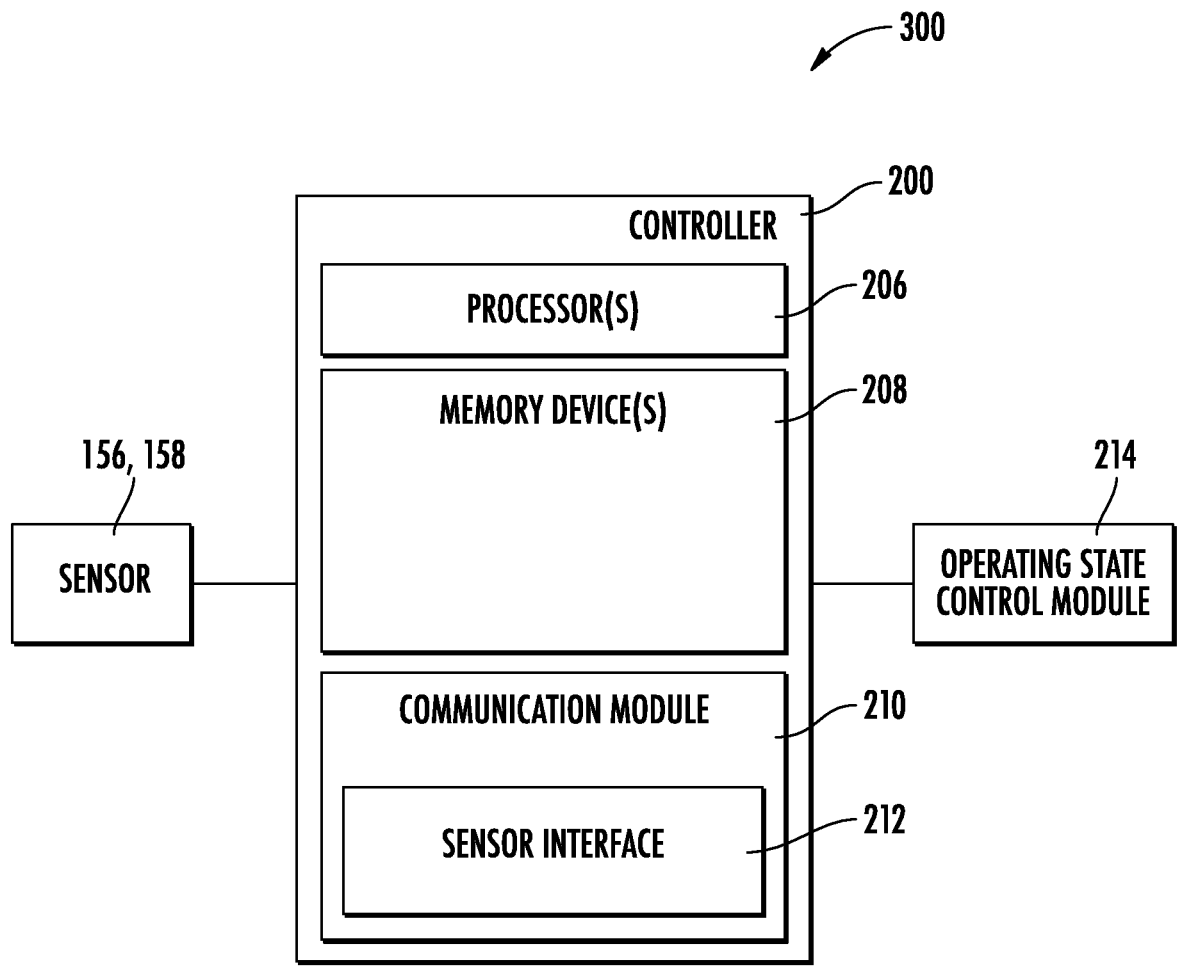
FIG. 3 illustrates a schematic diagram of one embodiment of a controller according to the present disclosure.
Figure 4:
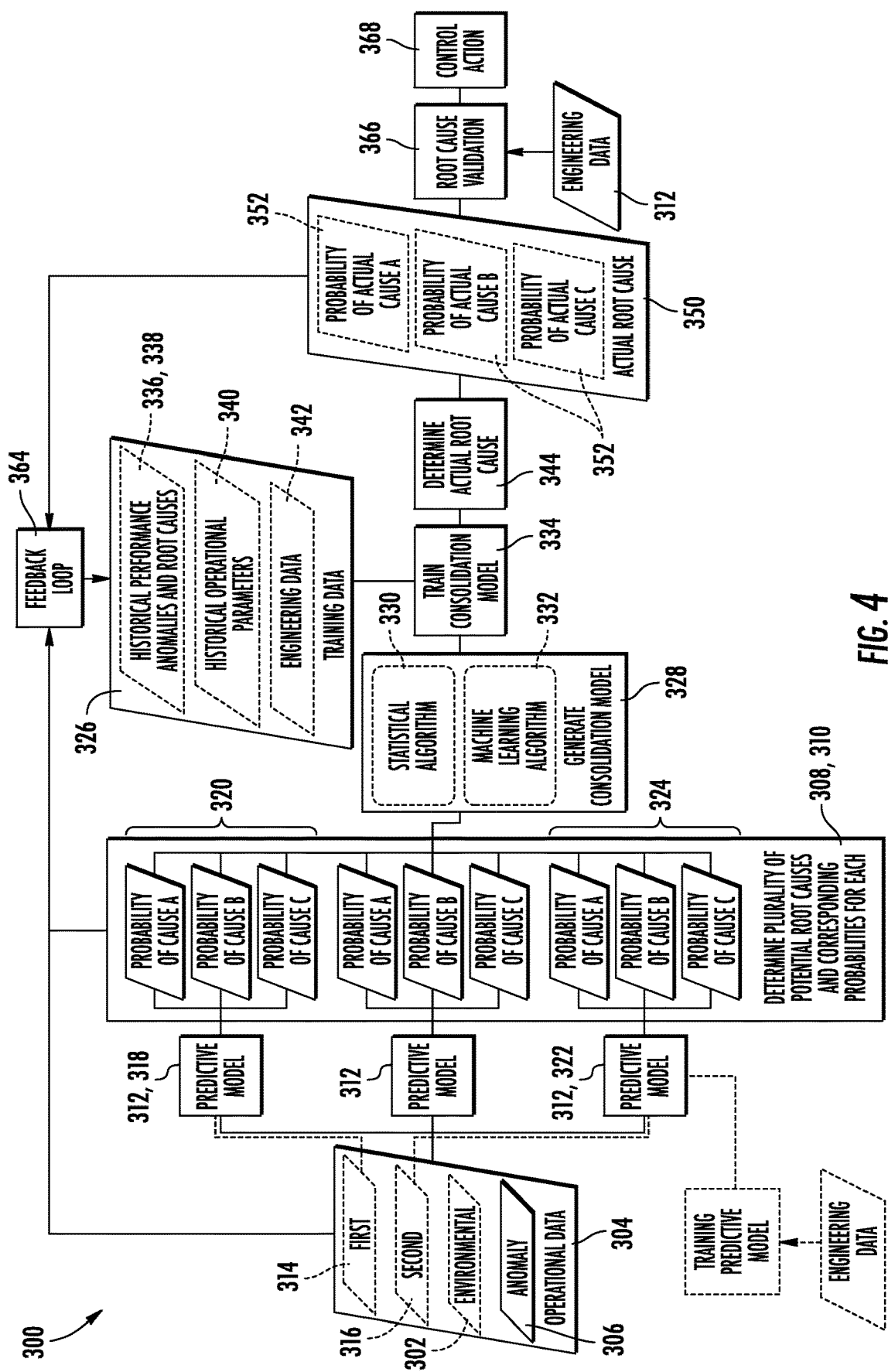
FIG. 4 illustrates a schematic diagram of one embodiment of a control logic of a system for operating a power generating asset according to the present disclosure.

Referring now to FIGS. 3-6, various aspects of multiple embodiments of a system 300 for operating the power generating asset 100 according to the present disclosure are presented. For example, as described herein, the system 300 may be utilized for operating the wind turbine 114 described above. However, it should be appreciated that the disclosed system 300 may be used any other power generating asset 100 having any suitable configuration. In addition, although FIG. 4 depicts steps performed in a particular order for purposes of illustration and discussion, the methods and steps described herein are not limited to any particular order or arrangement. One skilled in the art using the disclosures provided herein, will appreciate that various steps of the method may be omitted, rearranged, combined and/or adapted in various ways.

As shown particularly in FIG. 3, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the wind turbines 100, and components thereof. Further, the communications module 210 may include a sensor interface 212 (e.g., one or more analog-to-digital converters) to permit signals transmitted from one or more sensors, such as the environmental sensor(s) 156 and/or the operational sensor(s) 158 to be converted into signals that can be understood and processed by the processors 206. It should be appreciated that the sensors may be communicatively coupled to the communications module 210 using any suitable means. For example, as shown in FIG. 3, the sensors may be coupled to the sensor interface 212 via a wired connection. However, in other embodiments, the sensors 156, 158 may be coupled to the sensor interface 212 via a wireless connection, such as by using any suitable wireless communications protocol known in the art. Additionally, the communications module 210 may also be operably coupled to an operating state control module 214 configured to implement a control action.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, determining the actual root cause of a performance anomaly based on a plurality of potential root causes of the performance anomaly and the plurality of corresponding probabilities as described herein, as well as various other suitable computer-implemented functions.

Referring particularly to FIG. 4, in an embodiment, the controller 200 of the system 300 may be configured to receive a plurality of operational data sets 304. The operational data sets 304 may be indicative of a performance anomaly 306 for the power generating asset 100. The operational data sets 304 may, in an embodiment, include multiple parameters associated with the performance and/or health of a component of the power generating asset 100, the environmental data set 302, and/or data indicative of a performance parameter of the power generating asset 100 which is subject to monitoring. For example, in an embodiment, the performance parameter may comprise the power outputs of the wind turbine 114. In an embodiment, the performance parameter may be a tip speed ratio, a pitch setpoint, a yawing moment, and/or a bending moment. In other words, the plurality of operational data sets 304 may include a plurality of performance analytics, which generally refer to collected and analyzed data associated with the performance and/or health of the power generating asset 100, which may be characterized, stored, and/or analyzed to study various trends or patterns in the data.

In an embodiment, the controller 200 may determine a plurality of potential root causes 308 of the performance anomaly 306 and a plurality of corresponding probabilities 310 for each of the identified potential root causes 308 based on the operational data sets 304. In other words, in an embodiment, the controller 200 may determine a number of potential root causes 308 and the likelihood that each of the potential root causes 308 is the actual root cause 350 of the performance anomaly 306.

In an embodiment, the potential root causes 308 of the performance anomaly 306 and a number of corresponding probabilities 310 for each of the potential root cases 308 may be determined by the controller 200 via the execution of a plurality of predictive models 312 (e.g. root-cause predictive models). The predictive models 312 may, for example, include feature-based AI models, image-based AI models, time-series-based AI models, and/or any other suitable AI model configured to analyze at least a portion of the operational data set 304 and identify potential root causes 308 of the performance anomaly 306. In other words, in an embodiment, the predictive models 312 may, for example, be classification models (e.g. a neural network classification model). Each classification model may be configured to determine and refine an optimal mapping (e.g. transfer function) between a set of inputs (e.g. the portion of the operational data set 304) and the outputs (e.g. the probability 310 that an identified root cause 308 is the actual root cause 350 of the performance anomaly 306).

Each of the predictive models 312 may, in an embodiment, evaluate at least a portion of the operational data sets 304 which is different than an additional portion of the operational data sets 304 evaluated by the remaining predictive models 312. For example, in an embodiment, the operational data sets 304 may include at least a first operational data set 314 and a second operational data set 316.

Upon detecting the performance anomaly 306, a first predictive model 318 may analyze the first operational data set 314 in order to develop a first plurality 320 of potential root causes 308 and corresponding probabilities 310. Additionally, a second predictive model 322 may analyze the second operational data set 316 in order to develop a second plurality 324 of potential root causes 308 and corresponding probabilities 310. Therefore, the first plurality 320 of potential root causes 308 may correlate to the first operational data set 314, while the second plurality 324 of potential root causes 308 may correlate to the second operational data set 316. In such an embodiment, at least a portion of the second operational data set 316 may be different than the first operational data set 314.

It should be appreciated that since the predictive models 312 may apply differing modeling approaches and/or evaluate different portions of the operational data sets 304, at least a portion of the predictive models 312 may, as depicted in FIG. 6, generate a differing plurality of potential root causes 308 and/or corresponding probabilities 310 then may be determined by at least one other predictive model 312 of the plurality of predictive models 312. For example, in an embodiment, the first operational data set 314 may include data indicative of high levels of vibration within the gearbox 126. The first predictive model 318 may determine that the most likely root cause 308 of the performance anomaly 306 indicated by the vibrations is a failed/failing bearing of the gearbox 126. However, the second operational data set 316 may include data indicative of elevated oil temperatures within the gearbox 126. Based on the second operational data set 316, the second predictive model 322 may determine that the most likely root cause 308 of the performance anomaly 306 is an inadequate oil supply within the gearbox 126. Therefore, it should be appreciated that without the benefits of the fusion and consolidation disclosed herein, pursuing the differing potential root causes 308 may result in the performance of unnecessary, redundant, and/or inadequate maintenance activities.

In an embodiment, at least one of the predictive models 312 may be configured to classify the plurality of potential root causes 308 of the performance anomaly 306 and corresponding probabilities 310 thereof based on the operational data sets 304. Accordingly, in an embodiment wherein at least one of the predictive models 312 is a feature-based AI model, the predictive model(s) 312 may be generated by performing feature engineering to derive both physics-based and data-driven features from time series data. Additionally, in an embodiment an image-based AI model may be generated by selecting pairs of time series data to establish a set of arranged scatterplots and converting the scatterplots into an image. In a further embodiment, the image-based AI model may be generated by the annotation of photographically captured defects in/on a component of the power generating asset 100 (e.g., on a rotor blade 112 of the wind turbine 114). In yet a further embodiment, a time-series-based AI model may be generated by identifying time-dependent data patterns from time series data. As will be discussed more fully below, following generation, each of the predictive models 312 may be trained via a training data set 326. It should be appreciated that any number of predictive models 312 may be generated, such that a separate predictive model 312 may be created for subsets of feature sets such that the absence of one or more feature analytics will not prevent the algorithm from operating properly.

Figure 5:
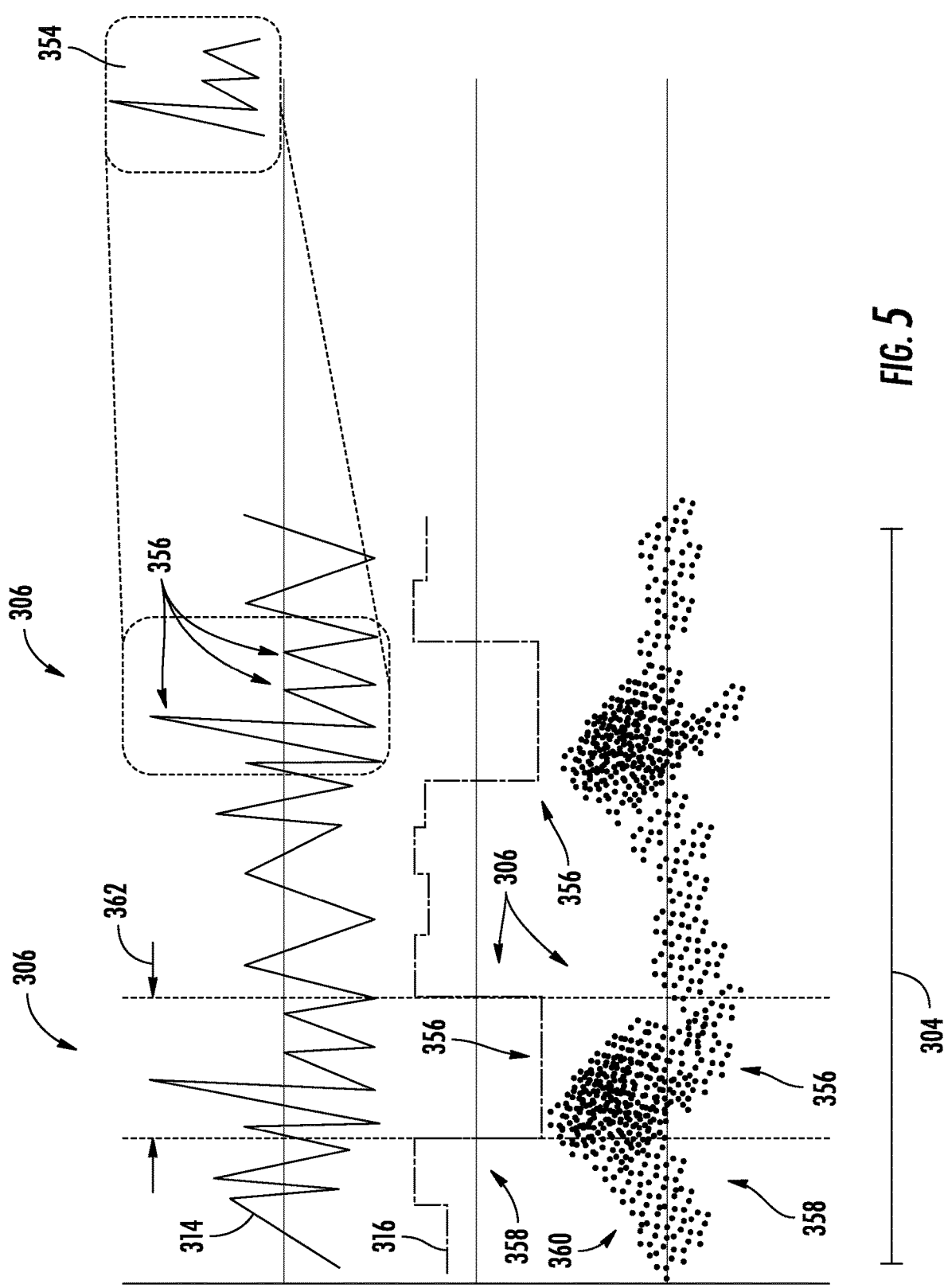
FIG. 5 illustrates a graphical representation of a plurality of operational data sets according to the present disclosure.

In an embodiment, determining the potential root causes 308 and the corresponding probabilities for each 310 may, as depicted in FIG. 5, include determining a performance anomaly signature 354 for the performance anomaly 306 has reflected by at least one of the operational data sets 304. The performance anomaly signature 354 may include a plurality of data points 356 indicative of an occurrence of the performance anomaly 306. In an embodiment, the determination of the performance anomaly signature 354 may facilitate an identification of performance anomaly instances 358 within at least one additional operational data set of the operational data sets 304. For example, in an embodiment, the determination of the performance anomaly signature 354 as reflected in the first operational data set 314 may facilitate the detection of the performance anomaly 306 in the data points 356 of the second operational data set 316 and/or a third operational data set 360. It should be appreciated that the performance anomaly signature 354 may be a pattern, value, concentration, photograph example, and/or other suitable arrangements of the data points 356 which may serve to identify the presence, or potential presence of the performance anomaly 306.

Since each of the predictive models 312 may be configured to evaluate somewhat different portions of the operational data set 304, it may be desirable to ensure that the data points 356 evaluated by each of the predictive model 312 correlates to the performance anomaly 306. As such, in an embodiment, the controller 200 may define an anomaly range 362 within at least one of the operational data sets 304. By applying the anomaly range 362 to each of the remaining operational data sets 304, the corresponding potential root causes 308 and probabilities 310 may then be determined by each corresponding predictive model 312 based on the data points 356 which fall within the anomaly range 362. For example, in an embodiment, such as depicted in FIG. 5, the first, second, and third operational data sets 314, 316, 360 may be time-series data sets. As such, the anomaly range 362 may define a time-based sampling interval. The corresponding predictive models 312 may then evaluate the respective data points 356 falling within the time-based sampling interval. However, in an additional embodiment, the anomaly range 362 may vary across the operational data sets 304 based on the data type of each of the operational data sets 304. For example, while the first operational data set 314 may include time-series data, the second operational data set 316 may include feature-based data, while the third operational data set 360 may be an image-based data set. Accordingly, the anomaly range 362 for the second and third operational data sets 316, 360 may be selected to correlate to the sampling period of the first operational data set 314 but may be configured as appropriate for the differing data types.

In an embodiment, the controller 200 may be configured to generate a consolidation model 328. Thus, the consolidation model 328 may classify the potential root causes 308 of the performance anomaly 306 and the plurality of corresponding probabilities 310 for each of the potential root causes 308.

In an embodiment, as shown, the consolidation model 328 may include a statistical algorithm 330 and/or a machine learning algorithm 332. In such embodiments, the statistical/machine learning algorithm 330, 332 may be configured to determine an optimal transfer function between the plurality of probabilities 310 for each of the potential root causes 308 and an actual (e.g. consolidated) probability 352 for each of the potential root causes 308.

For example, in an embodiment, a stepwise logistic regression may be utilized to generate the predictive model 312 and/or the consolidation model 328. Generally, stepwise logistic regression adds or removes features one at a time in an attempt to get the best regression model without over fitting. Further, stepwise regression typically has two variants including forward and backward regression, both of which are within the scope and spirit of the invention. For example, forward stepwise regression is a step-by-step process of building a model by successive addition of predictive variables. At each step, models with and without a potential predictor variable are compared, and the larger model is accepted only if it leads to a significantly better fit to the data. Alternatively, backward stepwise regression starts with a model with all predictors and removes terms that are not statistically significant in terms of modeling the response variable.

Another statistical method which may be employed in an embodiment to generate the models 312, 328 may be a least absolute shrinkage and selection operator (LASSO) algorithm. Generally, a LASSO algorithm minimizes the negative log-likelihood subject to a constraint that the sum of the absolute value of the coefficients is smaller than a constant. Still another statistical algorithm that may be employed to generate the models 312, 328 is an M5 Prime (M5P) algorithm, which is a tree-based classification and regression algorithm that is effective in many domains. For example, whereas stepwise logistic regression may produce a single global linear model for the data, tree-based classification and regression algorithms may perform logical tests on features to form a tree structure. Generally, the M5P algorithm utilizes a linear regression model at each node of the tree, providing more specialized models. In an additional embodiment, other machine learning methods which may be employed to generate the models 312, 328 may include Gaussian Process Models, Random Forest Models, Neural Network and/or Support Vector Machines.

As depicted at 334, the controller 200 may train (e.g. via machine learning) the consolidation model 328, via a training data set 326, to correlate the potential root causes 308 and the corresponding probabilities 310, generated by the predictive models 312, to the actual root cause 350 for the performance anomaly 306. In other words, the controller 200 may utilize the training data set 326 to train the consolidation model 328 so that the consolidation model 328 may determine the actual root cause 350 of the performance anomaly 306 from amongst the plurality of potential root causes 308 and corresponding probabilities 310.

In an embodiment, the training data set 326 may include a plurality of indications of historical performance anomalies 336. In an embodiment, the training data set may also include a plurality of historical root causes 338 which correspond to the historical performance anomalies 336. In a further embodiment, the training data set 326 may include a plurality of historical operational parameters 340. The historical operational parameters 340 may correspond to operational data sets 304 which have been previously recorded. In other words, the training data set may, in an embodiment, may include recordings of annotated, previously encountered performance anomalies, the monitored operating parameters of the power generating asset 100 at the time the performance anomaly was encountered, and/or the actual root cause of the performance anomaly as may be determined by an investigation into the performance anomaly.

As used herein, "annotation" in machine learning generally refers to a process of labeling data in a manner that can be recognized by machines or computers. Furthermore, such annotation can be completed manually by humans as human annotators may better interpret subjectivity, intent, and ambiguity within the data. Thus, machines can learn from the annotated data by recognizing the human annotations over time. In some cases, annotation can be learned by artificial intelligence and/or other algorithms, such as semi-supervised learning clustering as well as any other suitable accurate labeling process. It should be appreciated that the training data set may be developed based on the performance of the power generating asset 100 and/or additional power generating assets having the same or similar configurations as the power generating asset 100.

In an additional embodiment, the training data set 326 may include an engineering data set 342. The engineering data set 342 may facilitate the correlation of performance anomalies to various nominal and/or actual root causes. The engineering data set 342 may, in an embodiment, include an engineering diagnostic expert system. The engineering diagnostic expert system may include manifestations of the engineering domain knowledge, such as troubleshooting guides, anomaly validation reports, after-action reports, design specifications, testing reports, and/or other captures of the experience and decision-making knowledge of a human expert. It should be appreciated that the inclusion of the engineering data set 342 into the training data set 326 may improve the accuracy and/or efficiency of the training of the models 312, 328 by refining the interpretation of the recorded parameters with the experiential knowledge of human engineers and technicians.

In an embodiment, as shown at 334, training the consolidation model 328 may include developing a plurality of correlations between the historical root causes 338 and a plurality of operational parameters as reflected by the operational data sets 304. For example, in an embodiment, the controller 200 may include a supervised machine learning algorithm which may apply what has been learned in the past to new data using labeled data to determine the actual root cause 350 of the anomaly 306. Starting from the model build, the learning algorithm may produce an inferred function to make a determination about the output values. As such, the controller 200 may be able to provide targets for any new input after sufficient training. The learning algorithm may also compare its output with the correct, intended output to find errors in order to modify the model accordingly. Thus, as shown at 334, the training of the consolidation model 328 may facilitate the determination of the optimal transfer function which fuses and consolidates the potential root causes 308 and corresponding probabilities 310 developed by the predictive models 312 in order to determine the actual root cause 350 of the performance anomaly 306.

As depicted at 344, in an embodiment, the controller 200 may determine, via the consolidation model 328, the actual root cause 350 of the performance anomaly 306 based on the potential root causes 308 of the performance anomaly 306 and the corresponding probabilities 310. Accordingly, the controller 200 may utilize the consolidation model 328, as trained at 334, to determine an optimal mapping between the various potential root cause probabilities 310 determined by the predictive models 312 and the actual root cause 350 of the performance anomaly 306. In other words, in an embodiment, the consolidation model 328 may employ the statistical algorithm 330 and/or the machine learning algorithm 332 to determine an optimal correlation between the outputs of the predictive models 312 (as the inputs to the consolidation model 328) and the actual root cause 350 (as the output of the consolidation model 328). For example, when configured as a neural network, the consolidation model 328 may find the optimal mapping between the potential root cause probabilities 310 of the first plurality of potential root causes 320, the potential root cause probabilities 310 of the second plurality of potential root causes 324, and the actual root cause probabilities 352. It should be appreciated that in an embodiment, the actual root cause 350 may be output as a single identified root cause or as a rank-ordered list of root causes and corresponding actual probabilities 352.

In an embodiment, the training of the consolidation model 328 may result in the consolidation model 328 applying different weights to the potential root cause probabilities 310 generated by each of the predictive models 312. For example, in an embodiment, the historical data of the training data set 326 may indicate that for certain operational anomalies 306 as indicated by certain operational data sets 304, the output of the second predictive model 322 should be given greater weight by the consolidation model 328.

By way of further illustration, in FIG. 6, the analysis of an exemplary historical anomaly case is described in line 346. As depicted, the analysis of the historical anomaly case by the first predictive model 318 may result in a determination of a 70% likelihood that potential cause A is the root cause of the performance anomaly 306. An analysis of the same historical anomaly by the second predictive model 322 may result in a determination that there exists a 60% likelihood of potential cause B being the root cause of the performance anomaly 306. Utilizing at least these determinations as inputs, the consolidation model 328, may determine that for the conditions described in the historical anomaly case, the output of the second predictive model 322 should be given a greater weight. This, in turn, may result in the consolidation model 328 determining that there exists a 70% likelihood that cause B is the actual root cause 350. It should therefore be appreciated that, in an embodiment, the actual root cause 350 as determined by the consolidation model 328 may not be the potential root cause 308 having the highest single potential root cause probability 310 as determined by the predictive models 312. Rather, the consolidation model 328 fuses and consolidates the outputs of each of the predictive model 312 to determine the optimal mapping between the actual root cause 350 and the operational anomaly 306 under the monitored operating parameters.

Referring again to FIG. 4, in an embodiment, the operational data sets 304, the potential root causes 308 and corresponding probabilities 310, and the actual root cause 350 determined by the consolidation model 328 may be incorporated into the training data set 326. Incorporating these elements into the training data set 326 may establish a training feedback loop 364. The training feedback loop 364 may, in an embodiment, establish a continuous learning feature whereby the models 312, 328 may be continuously refined. It should be appreciated that the continued refinement of the models 312, 328 may result in increasing the accuracy of the actual root cause 350 determination, and thereby facilitate a reduction in power generating asset 100 downtime. For example, the accurate determination of the actual root cause 350 may result in a decreased number of tower climb events in the case of the rotor blade misalignment detection for a wind turbine 114.

As depicted at 366, in an embodiment, the controller 200 may validate the actual root cause 350 of the performance anomaly 306 determined by the consolidation model 328. In an embodiment, the validation of the actual root cause 350 may be accomplished via the engineering data set 342. In such an embodiment, the engineering data set 342 may include a nominal plurality of root cause-to-anomaly correlations. For example, the controller 200 may compare the determined actual root cause 350 to the engineering data set 342 in order to evaluate whether the determined actual root cause 350 is a viable root cause given the nominal data concerning the power generating asset 100.

In an embodiment, the system 300 may implement a control action 368 based on the determined actual root cause 350. For example, in an embodiment, the control action 368 may include generating an alarm. The generation of the alarm may facilitate the scheduling of a maintenance event in order to address the actual root cause 350 of the performance anomaly 306. Accordingly, the alarm may include an auditory signal, a visual signal, an alert, a notification, a system input, and/or any other system which may identify the root cause to an operator. It should be appreciated that the control action 368 as described herein may further include any suitable command or constraint by the controller 200. For example, in an embodiment, the control action 368 may include temporarily de-rating the power generating asset 100. Additionally, in an embodiment, the control action 368 may include limiting an operation of at least one component of the power generating asset. For example, the control action 368 may limit a pitching of a rotor blade 112 and/or a yawing of the nacelle 106 of the wind turbine 114.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for operating a power generating asset, the method comprising: receiving, with a controller, a plurality of operational data sets including data indicative of a performance anomaly for the power generating asset; determining, via a plurality of predictive models implemented by the controller, a plurality of potential root causes of the performance anomaly and a plurality of corresponding probabilities for each of the plurality of potential root causes based on the plurality of operational data sets; generating, via the controller, a consolidation model classifying the plurality of potential root causes of the performance anomaly and the plurality of corresponding probabilities for each of the plurality of potential root causes; training, via the controller, the consolidation model via a training data set to correlate the plurality of potential root causes and the plurality of corresponding probabilities to an actual root cause for the performance anomaly; determining, via the consolidation model implemented by the controller, the actual root cause of the performance anomaly based on the plurality of potential root causes of the performance anomaly and the plurality of corresponding probabilities; and implementing a control action based on the determined actual root cause.

Clause 2. The method of any preceding clause, wherein generating the consolidation model further comprises generating a statistical algorithm or machine learning algorithm configured to determine an optimal transfer function between the plurality of probabilities for each of the plurality of potential root causes and an actual probability for each of the plurality of potential root causes.

Clause 3. The method of any preceding clause, wherein the training data set comprises a plurality of indications of historical performance anomalies, a plurality of corresponding historical root causes, and a plurality of historical operational parameters.

Clause 4. The method of any preceding clause, wherein training the consolidation model further comprises: developing a plurality of correlations between the plurality of historical root causes and a plurality of operational parameters reflected by the plurality of operational data sets.

Clause 5. The method of any preceding clause, wherein the plurality of operational data sets includes an environmental data set, the environmental data set including a plurality of parameters indicative of at least one environmental condition affecting the power generating asset.

Clause 6. The method of any preceding clause, wherein the training data set further comprising an engineering data set, the engineering data set correlating the performance anomalies to the actual root cause.

Clause 7. The method of any preceding clause, further comprising: incorporating the plurality of operational data sets, the plurality of potential root causes and corresponding probabilities, and the actual root cause determined by the consolidation model into the training data set so as to establish a training feedback loop.

Clause 8. The method of any preceding clause, wherein the plurality of operational data sets comprises, at least, a first operational data set and a second operational data set, wherein the plurality of potential root causes of the performance anomaly and the plurality of corresponding probabilities for each of the plurality of potential root causes comprises, at least, a first plurality of potential root causes and corresponding probabilities and a second plurality of potential root causes and corresponding probabilities, the first plurality of potential root causes correlating to the first operational data set and the second plurality of potential root causes correlating to the second operational data set, and wherein at least a portion of the second operational data set is different than the first operational data set.

Clause 9. The method of any preceding clause, wherein determining the plurality of potential root causes of the performance anomaly and the plurality of corresponding probabilities for each of the plurality of potential root causes further comprises: determining a performance anomaly signature for the performance anomaly as reflected by at least one of the plurality of operational data sets, the performance anomaly signature comprising a plurality of data points indicative of an occurrence of the performance anomaly, the determination of the performance anomaly signature facilitating an identification of performance anomaly instances within at least one additional operational data set of the of the plurality of operational data sets.

Clause 10. The method of any preceding clause, further comprising: defining an anomaly range for each instance of the performance anomaly within at least one of the operational data sets, wherein the corresponding plurality of potential root causes and corresponding probabilities are determined by the corresponding predictive model based on data points of the plurality of data points that fall within the anomaly range.

Clause 11. The method of any preceding clause, further comprising: applying, via the controller, the anomaly range to each of the remaining operational data sets, wherein the corresponding plurality of potential root causes and corresponding probabilities for each of the remaining operational data sets are determined by the corresponding predictive model based on the data points of the plurality of data points that fall within the anomaly range for each of the operational data sets.

Clause 12. The method of any preceding clause, further comprising: validating the actual root cause of the performance anomaly determined by the consolidation model via an engineering data set, wherein the engineering data set comprises a nominal plurality of root cause-to-anomaly correlations.

Clause 13. The method of any preceding clause, wherein at least one predictive model of the plurality of predictive models is configured to classify the plurality of potential root causes and corresponding probabilities thereof of the performance anomaly based on one of the plurality of operational data sets; and training, via the controller, the at least one predictive model via the training data set.

Clause 14. The method of any preceding clause, wherein the power generating asset comprises at least one of a wind turbine, a solar power generating asset, a hydroelectric plant, and a hybrid power generating asset.

Clause 15. A system for operating a power generating asset, the system comprising: at least one sensor operably coupled to the power generating asset; and a controller communicatively coupled to the at least one sensor, the controller comprising at least one processor configured to perform a plurality of operations, the plurality of operations comprising: receiving a plurality of operational data sets including data indicative of a performance anomaly for the power generating asset, determining, via a plurality of predictive models, a plurality of potential root causes of the performance anomaly and a plurality of corresponding probabilities for each of the plurality of potential root causes based on the plurality of operational data sets, classifying the plurality of potential root causes of the performance anomaly and the plurality of corresponding probabilities for each of the plurality of potential root causes by executing a consolidation model, and determining, via the consolidation model, an actual root cause of the performance anomaly based on the plurality of potential root causes of the performance anomaly and the plurality of corresponding probabilities.

Clause 16. The system of any preceding clause, wherein the plurality of operations further comprises: generating a statistical algorithm or machine learning algorithm configured to determine an optimal transfer function between the plurality of probabilities for each of the plurality of potential root causes and an actual probability for each of the plurality of potential root causes.

Clause 17. The system of any preceding clause, wherein the plurality of operations further comprises: training the consolidation model by developing a plurality of correlations between the plurality of root causes and a plurality of operational parameters reflected by the operational data sets based on a training data set, wherein the training data set comprises a plurality of indications of historical performance anomalies, a plurality of corresponding root causes, and a plurality of historical operational parameters.

Clause 18. The system of any preceding clause, wherein the training data set further comprising an engineering data set, the engineering data set correlating the performance anomalies to the actual root cause.

Clause 19. The system of any preceding clause, wherein the plurality of operational data sets comprises, at least, a first operational data set and a second operational data set, wherein the plurality of potential root causes of the performance anomaly and the plurality of corresponding probabilities for each of the plurality of potential root causes comprises, at least, a first plurality of potential root causes and corresponding probabilities and a second plurality of potential root causes and corresponding probabilities, the first plurality of potential root causes correlating to the first operational data set and the second plurality of potential root causes correlating to the second operational data set, and wherein at least a portion of the second operational data set is different than the first operational data set.

Clause 20. The system of any preceding clause, wherein determining the plurality of potential root causes of the performance anomaly and the plurality of corresponding probabilities for each of the plurality of potential root causes further comprises: determining a performance anomaly signature for the performance anomaly as reflected by at least one of the plurality of operational data sets, the performance anomaly signature comprising a plurality of data points indicative of an occurrence of the performance anomaly, the determination of the performance anomaly signature facilitating an identification of performance anomaly instances within at least one of the plurality of operational data sets; defining an anomaly range for each instance of the performance anomaly within at least one of the operational data sets, wherein the corresponding plurality of potential root-cause and corresponding probabilities are determined by the corresponding predictive model based on data points of the plurality of data points that fall within the anomaly range; and applying the anomaly range to each of the remaining operational data sets, wherein the corresponding plurality of potential root causes and corresponding probabilities for each of the remaining operational data sets are determined by the corresponding predictive model based on the data points of the plurality of data points that fall within the anomaly range for each of the operational data sets.

What is claimed is:

1. A method for operating a power generating asset, the method comprising:
   receiving, with a controller, a plurality of operational data sets including data indicative of a performance anomaly for the power generating asset;
   determining, via a plurality of predictive artificial intelligence (AI) models implemented by the controller, a plurality of potential root causes of the performance anomaly and a plurality of corresponding probabilities for each of the plurality of potential root causes based on the plurality of operational data sets, the plurality of predictive AI models comprising a combination of at least one feature-based AI model, at least one image-based AI model, and at least one time-series-based AI model;
   generating, via the controller, a consolidation model by combining the combination of the feature-based AI model, the image-based AI model, and the time-series-based AI model into an AI fusion model, the consolidation model classifying the plurality of potential root causes of the performance anomaly and the plurality of corresponding probabilities for each of the plurality of potential root causes;

training, via the controller, the consolidation model via a training data set to correlate the plurality of potential root causes and the plurality of corresponding probabilities to an actual root cause for the performance anomaly;

determining, via the consolidation model implemented by the controller, the actual root cause of the performance anomaly based on the plurality of potential root causes of the performance anomaly and the plurality of corresponding probabilities; and implementing a control action based on the determined actual root cause, wherein the plurality of operational data sets, the plurality of potential root causes, the plurality of corresponding probabilities determined by each of the plurality of predictive AI models, and the actual root cause determined by the consolidation model are incorporated into the training data set so as to establish a training feedback loop, the training feedback loop establishing a continuous learning feature for continuously refining the plurality of predictive AI models and the consolidation model.

2. The method of claim 1, wherein generating the consolidation model further comprises generating a statistical algorithm or machine learning algorithm configured to determine an optimal transfer function between the plurality of corresponding probabilities for each of the plurality of potential root causes and an actual probability for each of the plurality of potential root causes.

3. The method of claim 1, wherein the training data set comprises a plurality of indications of historical performance anomalies, a plurality of corresponding historical root causes, and a plurality of historical operational parameters.

4. The method of claim 3, wherein training the consolidation model further comprises:
developing a plurality of correlations between the plurality of historical root causes and a plurality of operational parameters reflected by the plurality of operational data sets.

5. The method of claim 4, wherein the plurality of operational data sets includes an environmental data set, the environmental data set including a plurality of parameters indicative of at least one environmental condition affecting the power generating asset.

6. The method of claim 4, wherein the training data set further comprising an engineering data set, the engineering data set correlating the performance anomalies to the actual root cause.

7. The method of claim 1, wherein the plurality of operational data sets comprises, at least, a first operational data set and a second operational data set, wherein the plurality of potential root causes of the performance anomaly and the plurality of corresponding probabilities for each of the plurality of potential root causes comprises, at least, a first plurality of potential root causes and corresponding probabilities and a second plurality of potential root causes and corresponding probabilities, the first plurality of potential root causes correlating to the first operational data set and the second plurality of potential root causes correlating to the second operational data set, and wherein at least a portion of the second operational data set is different than the first operational data set.

8. The method of claim 1, wherein determining the plurality of potential root causes of the performance anomaly and the plurality of corresponding probabilities for each of the plurality of potential root causes further comprises:
determining a performance anomaly signature for the performance anomaly as reflected by at least one of the plurality of operational data sets, the performance anomaly signature comprising a plurality of data points indicative of an occurrence of the performance anomaly, the determination of the performance anomaly signature facilitating an identification of performance anomaly instances within at least one additional operational data set of the of the plurality of operational data sets.

9. The method of claim 8, further comprising:
defining an anomaly range for each instance of the performance anomaly within at least one of the operational data sets, wherein the corresponding plurality of potential root causes and corresponding probabilities are determined by the corresponding predictive model based on data points of the plurality of data points that fall within the anomaly range.

10. The method of claim 9, further comprising:
applying, via the controller, the anomaly range to each of the remaining operational data sets, wherein the corresponding plurality of potential root causes and corresponding probabilities for each of the remaining operational data sets are determined by the corresponding predictive model based on the data points of the plurality of data points that fall within the anomaly range for each of the operational data sets.

11. The method of claim 1, further comprising:
validating the actual root cause of the performance anomaly determined by the consolidation model via an engineering data set, wherein the engineering data set comprises a nominal plurality of root cause to anomaly correlations.

12. The method of claim 1, wherein the power generating asset comprises at least one of a wind turbine, a solar power generating asset, a hydroelectric plant, and a hybrid power generating asset.

13. A system for operating a power generating asset, the system comprising:
at least one sensor operably coupled to the power generating asset; and
a controller communicatively coupled to the at least one sensor, the controller comprising at least one processor configured to perform a plurality of operations, the plurality of operations comprising:
receiving a plurality of operational data sets including data indicative of a performance anomaly for the power generating asset;
determining, via a plurality of predictive artificial intelligence (AI) models, a plurality of potential root causes of the performance anomaly and a plurality of corresponding probabilities for each of the plurality of potential root causes based on the plurality of operational data sets, the plurality of predictive AI models comprising a combination of at least one feature-based AI models, at least one image-based AI models, and at least one time-series-based AI models;
generating a consolidation model by combining the combination of the feature-based AI model, the image-based AI model, and the time-series-based AI model into an AI fusion model;

classifying the plurality of potential root causes of the performance anomaly and the plurality of corresponding probabilities for each of the plurality of potential root causes by executing the AI fusion model;

training the consolidation model by developing a plurality of correlations between the plurality of root causes and a plurality of operational parameters reflected by the operational data sets based on a training data set; and determining, via the consolidation model, an actual root cause of the performance anomaly based on the plurality of potential root causes of the performance anomaly and the plurality of corresponding probabilities, wherein the plurality of operational data sets, the plurality of potential root causes, the plurality of corresponding probabilities determined by each of the plurality of predictive AI models, and the actual root cause determined by the consolidation model are incorporated into the training data set so as to establish a training feedback loop, the training feedback loop establishing a continuous learning feature for continuously refining the plurality of predictive AI models and the consolidation model.

14. The system of claim 13, wherein the plurality of operations further comprises:

generating a statistical algorithm or machine learning algorithm configured to determine an optimal transfer function between the plurality of corresponding probabilities for each of the plurality of potential root causes and an actual probability for each of the plurality of potential root causes.

15. The system of claim 13, wherein the training data set comprises a plurality of indications of historical performance anomalies, a plurality of corresponding root causes, and a plurality of historical operational parameters.

16. The system of claim 15, wherein the training data set further comprising an engineering data set, the engineering data set correlating the performance anomalies to the actual root cause.

17. The system of claim 13, wherein the plurality of operational data sets comprises, at least, a first operational data set and a second operational data set, wherein the plurality of potential root causes of the performance anomaly and the plurality of corresponding probabilities for each of the plurality of potential root causes comprises, at least, a first plurality of potential root causes and corresponding probabilities and a second plurality of potential root causes and corresponding probabilities, the first plurality of potential root causes correlating to the first operational data set and the second plurality of potential root causes correlating to the second operational data set, and wherein at least a portion of the second operational data set is different than the first operational data set.

18. The system of claim 13, wherein determining the plurality of potential root causes of the performance anomaly and the plurality of corresponding probabilities for each of the plurality of potential root causes further comprises:

determining a performance anomaly signature for the performance anomaly as reflected by at least one of the plurality of operational data sets, the performance anomaly signature comprising a plurality of data points indicative of an occurrence of the performance anomaly, the determination of the performance anomaly signature facilitating an identification of performance anomaly instances within at least one of the plurality of operational data sets;

defining an anomaly range for each instance of the performance anomaly within at least one of the operational data sets, wherein the corresponding plurality of potential root cause and corresponding probabilities are determined by the corresponding predictive model based on data points of the plurality of data points that fall within the anomaly range; and applying the anomaly range to each of the remaining operational data sets, wherein the corresponding plurality of potential root causes and corresponding probabilities for each of the remaining operational data sets are determined by the corresponding predictive model based on the data points of the plurality of data points that fall within the anomaly range for each of the operational data sets.

19. A method for operating a power generating asset, the method comprising:

receiving, with a controller, a plurality of operational data sets including data indicative of a performance anomaly for the power generating asset;

determining, via a plurality of predictive artificial intelligence (AI) models implemented by the controller, a plurality of potential root causes of the performance anomaly and a plurality of corresponding probabilities for each of the plurality of potential root causes based on the plurality of operational data sets, the plurality of predictive AI models comprising a combination of at least one feature-based AI model, at least one image-based AI model, and at least one time-series-based AI model;

generating, via the controller, a consolidation model by combining the combination of feature-based AI model, the image-based AI models, and the time-series-based AI model into an AI fusion model, the consolidation model classifying the plurality of potential root causes of the performance anomaly and the plurality of corresponding probabilities for each of the plurality of potential root causes;

training, via the controller, the consolidation model via a training data set to correlate the plurality of potential root causes and the plurality of corresponding probabilities to an actual root cause for the performance anomaly;

determining, via the consolidation model implemented by the controller, the actual root cause of the performance anomaly based on the plurality of potential root causes of the performance anomaly and the plurality of corresponding probabilities; and implementing a control action based on the determined actual root cause;

wherein determining the plurality of potential root causes of the performance anomaly and the plurality of corresponding probabilities for each of the plurality of potential root causes comprises:

generating the feature-based AI model by performing feature engineering to derive both physics-based and data-driven features from time series data;

generating the image-based AI model by selecting pairs of time series data to establish at least one set of scatterplots and converting the at least one set of scatterplots into an image; and generating the time-series based AI model by identifying time-dependent data patterns from time series data;

wherein the plurality of operational data sets, the plurality of potential root causes, the plurality of corresponding probabilities determined by each of the plurality of predictive AI models, and the actual root cause determined by the consolidation model are incorporated into the training data set so as to establish a training feedback loop, the training feedback loop establishing a continuous learning feature for continuously refining the plurality of predictive AI models and the consolidation model.

* * * * *